United States Patent [19]
Frankot et al.

[11] Patent Number: 5,488,374
[45] Date of Patent: Jan. 30, 1996

[54] MULTI-SCALE ADAPTIVE FILTER FOR INTERFEROMETRIC SAR DATA

[75] Inventors: Robert T. Frankot, Van Nuys; Ralph E. Hudson; George H. Senge, both of Los Angeles, all of Calif.

[73] Assignee: Hughes Aircraft Company, Los Angeles, Calif.

[21] Appl. No.: 323,414

[22] Filed: Oct. 14, 1994

[51] Int. Cl.$^6$ .................................................. G01S 13/90
[52] U.S. Cl. ........................ 342/25; 342/162; 342/194; 342/195
[58] Field of Search ..................... 342/25, 159, 195, 342/194, 197, 162

[56] References Cited

U.S. PATENT DOCUMENTS

| | | | |
|---|---|---|---|
| 4,999,635 | 3/1991 | Niho | 342/25 |
| 5,313,210 | 5/1994 | Gail | 342/25 |
| 5,332,999 | 7/1994 | Prati et al. | 342/25 |
| 5,334,980 | 8/1994 | Decker | 342/25 |
| 5,402,131 | 5/1995 | Pierce | 342/194 |
| 5,424,743 | 6/1995 | Ghiglia et al. | 342/25 |

Primary Examiner—John B. Sotomayor
Attorney, Agent, or Firm—Leonard A. Alkov; W. K. Denson-Low

[57] ABSTRACT

Apparatus including a multi-scale adaptive filter for smoothing interferometric SAR (IFSAR) data in areas of low signal-to-noise ratio (SNR) and/or coherence while preserving resolution in areas of high SNR/coherence. The multi-scale adaptive filter uses simple combinations of multiple linear filters applied to a complex interferogram. The multi-scale adaptive filter is computationally efficient and lends itself to parallel implementation. A pyramid architecture comprising a plurality of cascaded stages is employed which reduces the computational load and memory required for implementation of the processing algorithm. The multi-scale adaptive filter implements a processing algorithm that may be applied to standard IFSAR data. Its input is a complex interferogram (the conjugate product of two complex images) and its output is a filtered interferogram ($\bar{A}$) which is passed to an information extraction processor, that extracts a terrain elevation map, for example. The adaptive filter incorporates linear filters at two or more scales (i.e. filter impulse response widths) whose outputs are combined in a data-dependent manner. The combination rules result in an output interferogram ($\bar{A}$) that is filtered heavily in areas of low coherence and receives little or no filtering in areas of high coherence. The combination rules use a coherence measure that is a simple nonlinear function of the linear filter outputs themselves.

5 Claims, 3 Drawing Sheets

MULTI-SCALE ADAPTIVE FILTER FOR INTERFEROMETRIC SAR DATA

BACKGROUND

The present invention relates to synthetic aperture radar systems, and more particularly, to a multi-scale adaptive filter for use in processing interferometric synthetic aperture radar data.

One prior art technique for filtering synthetic aperture radar data involves fixed linear filters applied to the interferogram, which sacrifices resolution. Other prior art techniques involve nonlinear (e.g., median) filtering the interferogram phase, which also sacrifices resolution.

Therefore, it is an objective of the present invention to provide for an adaptive filter for use in processing interferometric synthetic aperture radar data that improves upon conventional techniques without sacrificing resolution.

SUMMARY OF THE INVENTION

In order to meet the above and other objectives, the present invention is a multiscale adaptive filter for smoothing interferometric SAR (IFSAR) data in areas of low signal-to-noise ratio (SNR) and/or coherence while preserving resolution in areas of high SNR/coherence. The multi-scale adaptive filter uses simple combinations of multiple linear filters applied to a complex interferogram (or complex image with reference phase removed). The present invention is computationally efficient and lends itself to parallel implementation. A pyramid architecture implementation is employed which reduces the computational load and memory required for implementation of the processing algorithm.

The interferometric SAR (IFSAR) multi-scale adaptive filter implements a processing algorithm that may be applied to standard IFSAR data. Its input is a complex interferogram (the conjugate product of two complex images) and its output is a filtered interferogram which is passed to standard IFSAR information extraction processor, which extracts a terrain elevation map, for example.

The adaptive filter of the present invention incorporates linear filters at two or more scales (i.e. filter impulse response widths) whose outputs are combined in a data-dependent manner. The combination rules result in an output interferogram that is filtered heavily in areas of low coherence and receives little or no filtering in areas of high coherence. The combination rules use a coherence measure that is a simple nonlinear function of the linear filter outputs themselves.

The present adaptive filter improves the quality of IFSAR data, for example, and improves the accuracy and smoothness of IFSAR-derived terrain elevation data. The effect of noise on terrain elevation is to substantially reduce the utility of contour maps, shaded relief maps, and other secondary products, in some cases making them uninterpretable. The effect of simple smoothing algorithms, however, is to reduce resolution and to obscure important features, such as towers and other navigation hazards. Improved-quality IFSAR data, overcoming noise but preserving detail where possible, is useful wherever elevation maps are required, especially where high resolution is important.

The advantage of the present invention is that it smooths the data where needed and leaves alone data that does not need smoothing. The present invention applies a linear filter that best matches the bandwidth of the underlying true signal at a given point in the image. For example, a small bright object imbedded in smooth terrain receives little or no smoothing while the surrounding terrain data is smoothed moderately. The invention also applies in areas with high signal-plus-noise bandwidth but low coherence (effective signal-to-noise ratio (SNR)). For example, small shadowed areas and points that scintillate down exhibit a high bandwidth but low SNR. These areas are smoothed until dominated by the surrounding finite SNR area.

The implementation of the adaptive filter is simple and efficient, using standard linear filters as building blocks. The combination rules are simple and include a tuning parameter that allows specification of the tradeoff between smoothing and resolution preservation. The adaptive filter may be used to process interferometric SAR data provided by any SAR system adapted to produce complex imagery output.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3b shows an equivalent form of the preprocessor of FIG. 3a;

DETAILED DESCRIPTION

Figure 1:
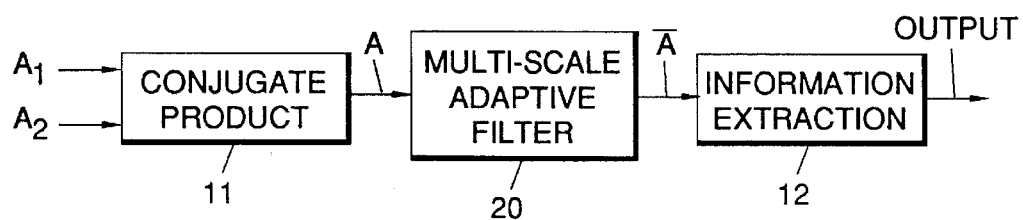
FIG. 1 illustrates an IFSAR system in which an adaptive filter in accordance with the principles of the present invention is employed.

Referring to the drawing figure, FIG. 1 illustrates an IFSAR system 10 in which a multi-scale adaptive filter 20 in accordance with the principles of the present invention is employed. Registered complex images ($A_1$, $A_2$) are applied as inputs to a conjugate product processor 11 which produces a complex interferogram or image (A) as its output. The complex interferogram or image (A) is an input to the multi-scale adaptive filter 20. The output of the multi-scale adaptive filter 20 is an filtered interferogram $\overline{A}$, which is applied to an information extraction processor 12 that produces an elevation map, velocity map, or other data product.

Figure 2:
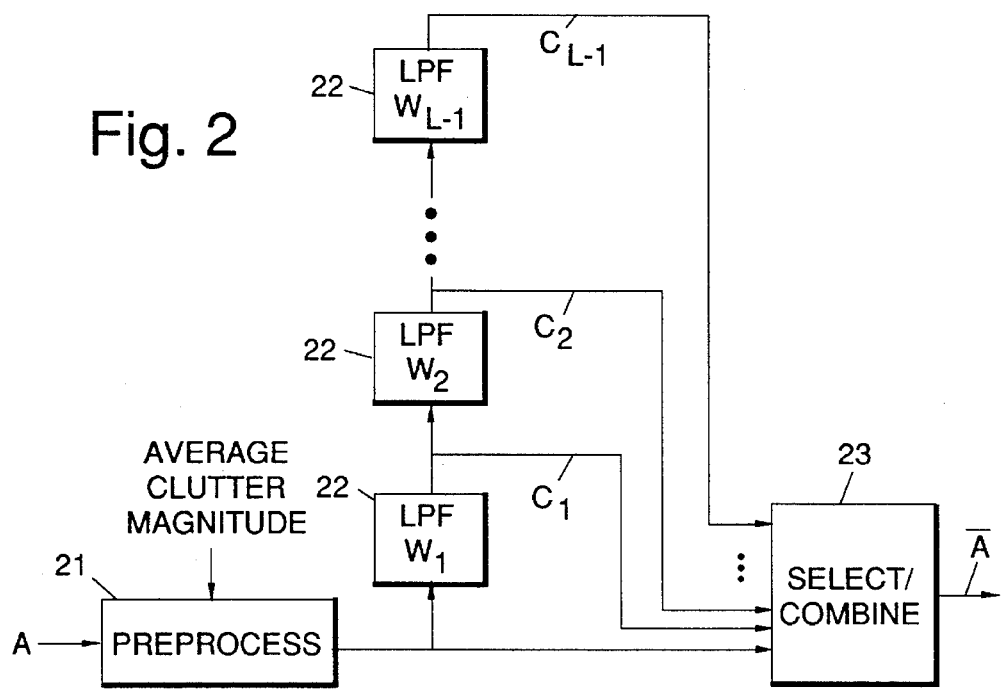
FIG. 2 shows a block diagram of a multi-scale adaptive filter in accordance with the principles of the present invention.

A block diagram of the multi-scale adaptive filter 20 is shown in FIG. 2. The input A(r, v) to the multi-scale adaptive filter 20 is a two-dimensional complex interferogram, or complex image, having a suitably normalized phase. A preprocessor 21 is used to normalize the magnitude of the input data. A preprocessed input $C_0(r, v)$ is then filtered with a cascade of L−1 linear low-pass filters 22 each characterized by impulse response function $w_l$. Outputs $C_l$, $l=1, \ldots$ , L−1 of the linear low-pass filters 22 are saved and passed to select/combine logic 23 that combines the resulting L complex images into a single complex interferogram/image.

The select/combine logic 23 treats each point (r, v) independently, point-by-point selecting or otherwise combining the L filter outputs to produce the output $\overline{A}$.

Figure 3A:
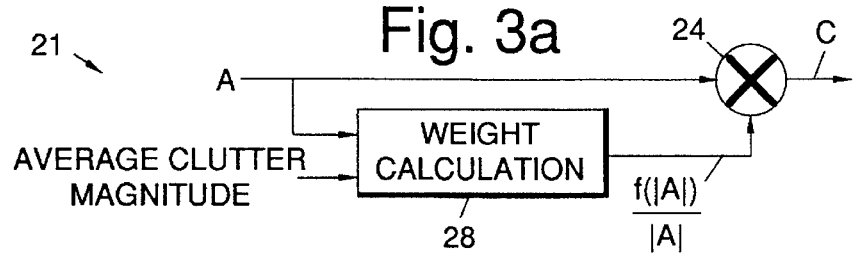
FIG. 3a shows an implementation of a preprocessor employed in the multi-scale adaptive filter of FIG. 2.

FIG. 3a shows an efficient implementation of the preprocessor 21 employed in the multi-scale adaptive filter 20 of FIG. 2. The preprocessor 21 processes the average clutter magnitude and the complex interferogram (A) by weighting 28 (weight calculation 28) the average clutter magnitude to produce a real-valued weighting function $f(|A|)/|A|$, which is combined in a multiplier 24 with the complex interferogram (A) to produce an output C, which corresponds to a phase-preserving soft limiter. The preprocessor 21 essentially forms a phase-preserving soft limiter with shape normalized by the average clutter magnitude.

Figure 3B:
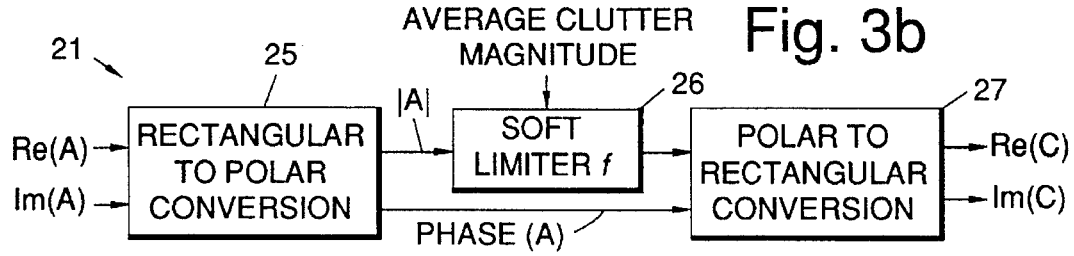

FIG. 3b shows an equivalent form of the preprocessor 21 of FIG. 3a that is used for input normalization to the multi-scale adaptive filter 20. More specifically, FIG. 3b conceptually shows the preprocessor 21 in therms of phase and magnitude. It is comprised of a rectangular to polar converter 25, a soft limiter 26 for determining an average clutter magnitude, and a polar to rectangular converter 27, interconnected as shown. The soft limiter 26 is applied to the magnitude component of each pixel. By applying the soft limiter 26 to the magnitude component prevents strong targets from dominating outputs from neighboring low-pass filters 22. Alternatively, it may be advantageous, but is not critical, to apply the soft limiter 26 to the individual images $A_1$ and $A_2$ before interferogram computation.

The characteristic $f$ of the soft limiter 26 is linear for low to moderate input magnitude values and has a monotonically-decreasing slope (e.g., a logarithmic response) for large input magnitudes. One example is the function $f(|A|)= \ln(|A|+\tau\rho^o$, where $\alpha$ is an estimate of average clutter. The design constant T has a nominal value of 1, but may be lower or higher. The average clutter estimate may also be obtained by averaging the logarithm of A.

The preprocessor 21 greatly reduces the tendency of strong targets to dominate outputs of neighboring low-pass filters 22 and results in data weighting similar to that obtained through maximum-likelihood approaches (mixed scintillation and additive noise models).

Figure 4:
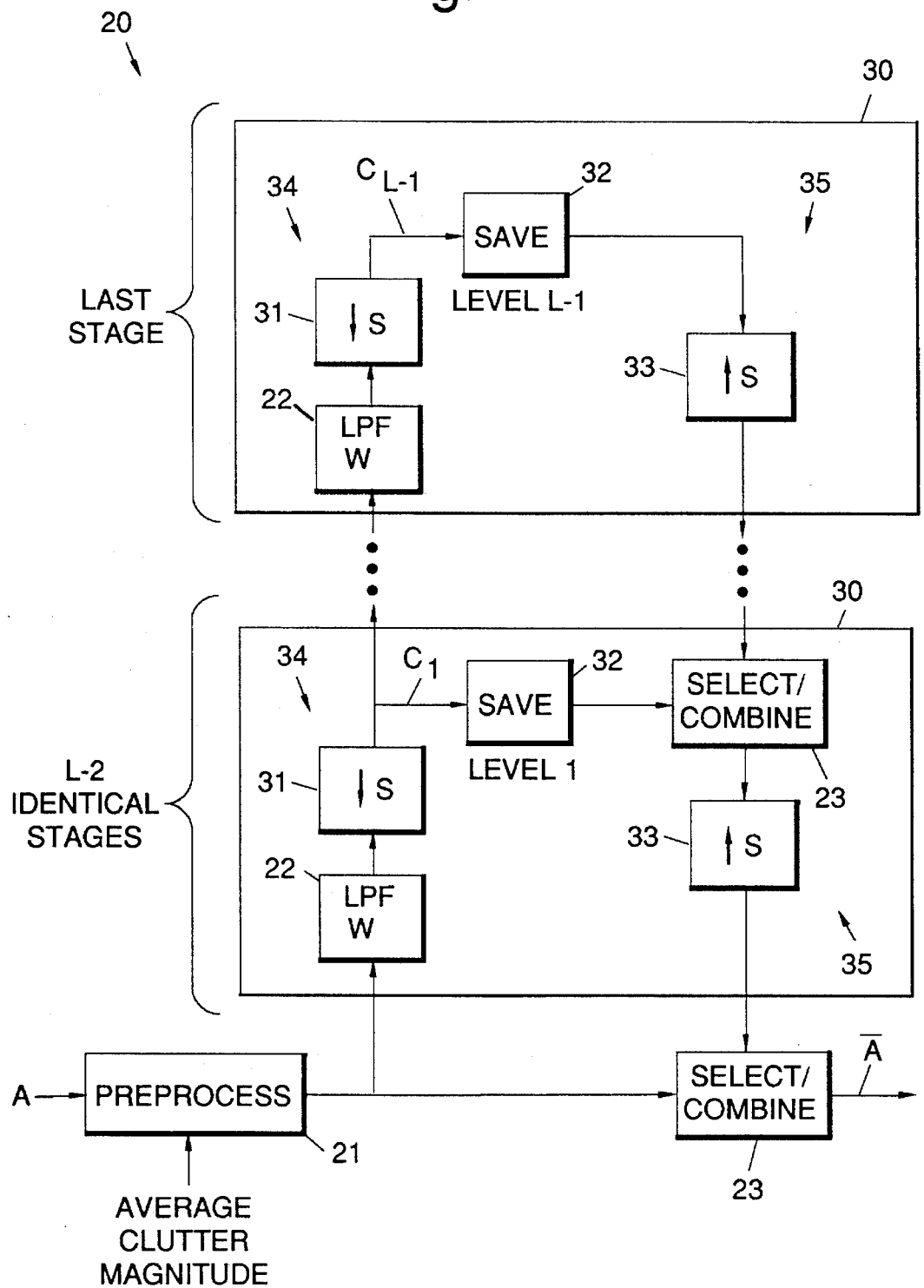
FIG. 4 shows the pyramid architecture employed in the multi-scale adaptive filter of FIG. 2.

The multi-scale structure of the multi-scale adaptive filter 20 lends itself to a pyramid implementation, illustrated in FIG. 4. More particularly, FIG. 4 shows the pyramid architecture employed in the multi-scale adaptive filter 20 of FIG. 2. There are a total of L pyramid levels. For level 0, no filtering is performed. At each successive level, the processing is identical except for the size of the image/interferogram. The implementation is therefore organized into L-1 stages 30, as is illustrated in FIG. 4. The last stage 30 is identical to all other, except that it terminates the pyramid. Each stage 30 has an ascending pass 34 (filter 22 and downsample 31 ) and descending pass 35 (select/combine logic 23 and upsample 33).

On an ascending pass 34, the linear low pass filter 22 with impulse response w is applied and its output is downsampled 31 by a factor s corresponding to the nyquist rate of the filter output. For example, if the filter 22 reduces the signal bandwidth by a factor of two, then a two-to-one downsampling 31 (s=2) is performed in both dimensions. This results in a factor of four fewer samples and reduces the number of computations in the next stage 30. The filtering 22 and downsampling 31 may also be combined into one module that avoids computing filter outputs at unused output samples, further reducing computation.

On the descending pass 35, the image from the $l^{th}$ pyramid level is combined with the upsampled version from the $(l+1)^{th}$ level. This is performed using a pairwise version of the select/combine logic 23 described below. The combined images are then upsampled 33 by a factor s. Standard pyramid synthesis filter types may be used which match the ascending low pass filter 22 with a descending interpolation filter (in the upsample 33).

The impulse response of the filter 22 generally has a low-pass characteristic. The details of the filter impulse response are not critical to the present invention, but desired characteristics are discussed below.

Each filter 2 computes a standard convolution as follows $$C_l(r,v) = \sum_{i,j} C_{l-1}(r-i, v-j) w_l(i,j). \qquad (1)$$

Computation of the above equation may be implemented in a spatially-separable form where $w_l(i,j)=w_l'(i)w_l'(j)$. This is appreciably more efficient for filters with large support width (distance over which w is nonzero).

A Gaussian filter shape may be employed, but uniform filters 22 are also reasonable and support recursive implementation for greater efficiency.

Impulse response width, which may be defined such that it corresponds directly with s, can be any number. A value of 2 is typical, especially for pyramid implementations, but 3, 4, 5, and larger impulse responses may also be used. A small impulse response width of $\sqrt{2}$ is compatible with a pyramid architecture that alternates between interlaced and non-interlaced grids at each level.

For the basic implementation to be equivalent to the pyramid implementation requires filters 22 with geometrically increasing widths for each level. i.e.

$$s_l = s^l \qquad (3)$$

where $s_l$ is the impulse response width for $w_l$.

It is convenient to set filter scaling so that the gain for coherent areas is unity, i.e, $$\sum_{i,j} w_l(i,j) = 1 \qquad (4)$$

Then noise-power gain is less than unity, i.e.

$$\sum_{i,j} w_l^2(i,j) < 1 \qquad (5)$$

Figure 5A:
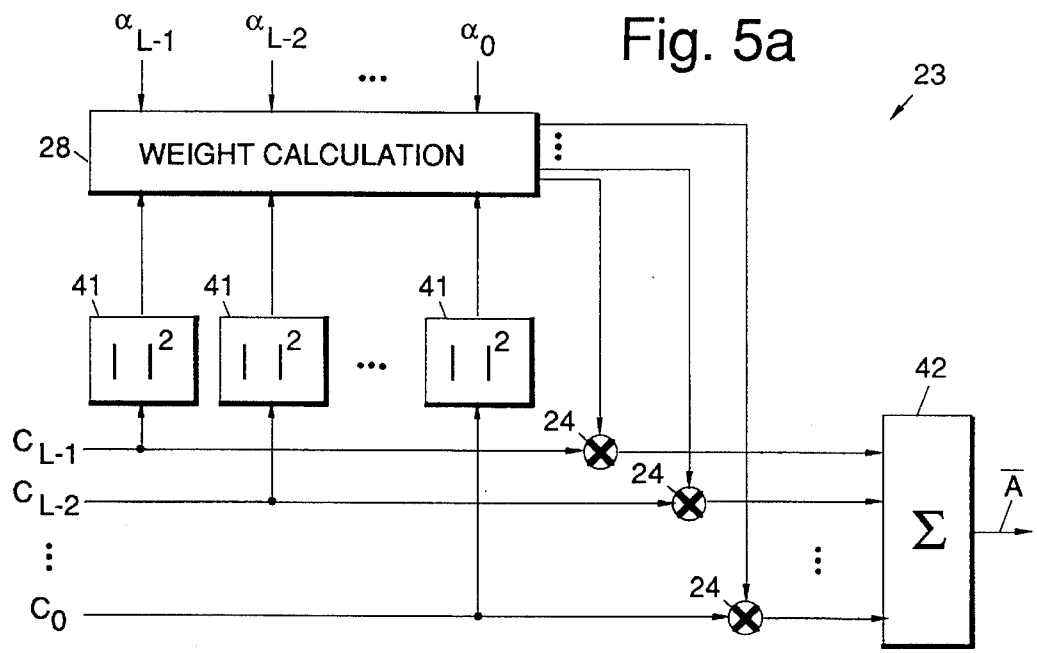
FIG. 5a, it shows a general form of select/combine filters that may be employed in the present invention.
Figure 5B:
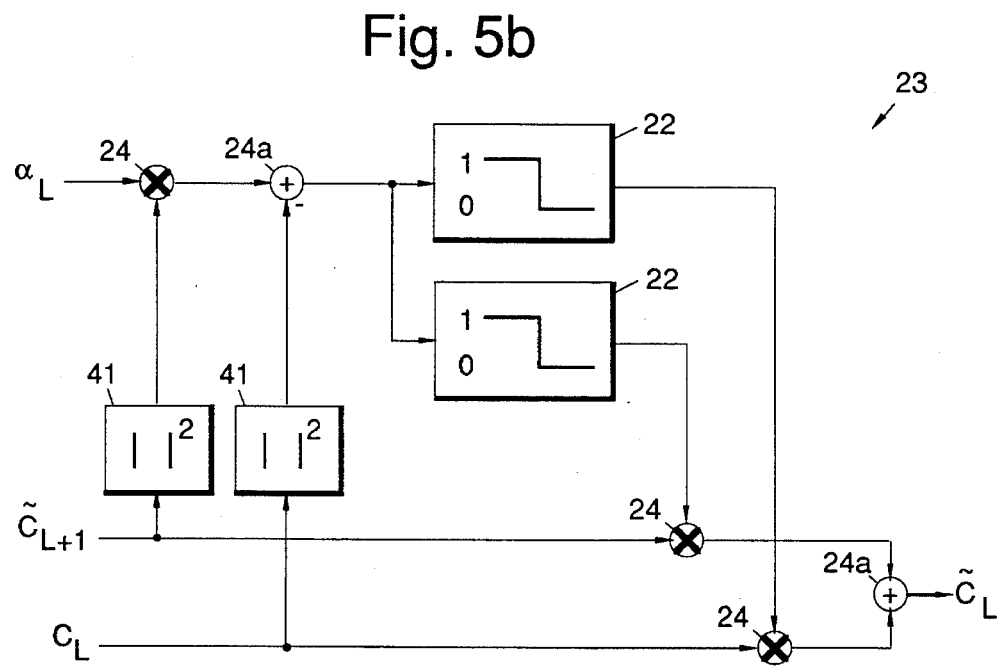
FIG. 5b shows a specific form (pairwise selection) of select/combine filters that may be employed for pyramid implementation in the present invention.

Referring to FIG. 5a, it shows a general form of select/combine logic 23 that may be employed in the present invention. The same operation is performed for each pixel, namely a weighted sum of complex inputs ($C_0 \ldots C_{L-1}$) where the weights are a function of the squared magnitudes 41 of the complex inputs. The filters are combined using multipliers 24 and a summing device 42 by selecting the filter (i.e., pyramid level) at each pixel that results in the maximum weighted output, i.e.

$$\overline{A}(r, v) = C_{L_0}(r, v) \qquad (6)$$

where $$L_0(r, v) = \arg \max_l \{\alpha^{-l} |C_l(r, v)|^2\} \qquad (7)$$

and $\alpha \leq 1$ is a tuning constant. FIG. 5b shows a specific form (pairwise selection) of the select/combine logic 23 that may be employed for pyramid implementation. The same operation is performed for every pixel wherein the output $\tilde{C}_l$ corresponds to the complex input that has the largest weighted magnitude-squared value.

The select/combine logic 23 is easily implemented for the pyramid version. A simple cascade of pairwise selections made at each level exactly implements the above rule.

An alternative implementation may also be provided wherein the filters 22 are combined by weighted summation. An alternative combination implementation is to calculate a weighted sum of all $C_l$, i.e.

$$A = \sum_{l=0}^{L-1} P_l C_l \quad (8)$$

for each point (r, v) in the image, where $$\sum_{l=0}^{L-1} P_l = 1 \quad (9)$$

The weights are obtained from some nonlinear function of all $|C_l|^2$, for example, $$P_l = \frac{\alpha^{-l}|C_l|^2}{\sum_{l=0}^{L-1} \alpha^{-k}|C_k|^2} \quad (10)$$

Selection of tuning parameter $\alpha$.

The role of $\alpha$ is to regulate the tradeoff between resolution preservation and coherence maximization. It may also be used to bias the selection towards larger filters 22 in noise-dominated areas that exceed the size of the largest effective filter 22 (i.e., smooth more when in doubt).

Nominal values of $\alpha$ may be selected through a hypothesis testing argument where, for example, a bright point target on a uniform clutter background is preserved at a moderate significance (confidence) level. For example, if the target-to-clutter ratio is 6 dB, a L-by-L uniform filter 22 is used and a "$3\sigma$" significance is desired. It may also be desirable to tune this nominal value slightly to compensate for $f$ or to adjust subjective quality like overall smoothness or accuracy of elevation estimates on well-behaved terrain.

In order to prove this adaptive filter concept, a rudimentary version of the multiscale adaptive filter 20 has been implemented by the assignee of the present invention and is used in IFSAR software, running on a Sun SPARCstation. The multi-scale adaptive filter 20 only has two levels (L=2), i.e. a single filter 22 with uniform weights of a user-selectable width. The multi-scale adaptive filter 20 uses pairwise selection to combine levels. The multi-scale adaptive filter 20 does not incorporate the preprocessor 21 (soft limiter 24). In tests performed using the multi-scale adaptive filter 20, it effectively met the objective of improving the smoothness of IFSAR-derived elevation data while preserving detail in areas of high apparent SNR. Furthermore, a four level version of the multi-scale adaptive filter 20 using a soft limiter and Gaussian filter shape has been implemented and has shown further qualitative improvement.

Thus there has been described a new and improved multi-scale adaptive filter for use in processing interferometric synthetic aperture radar data. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Apparatus for use with a synthetic aperture radar for processing interferometric synthetic aperture radar data comprising complex images, said apparatus comprising:

a conjugate product processor which is adapted to receive complex images and produce a complex interferogram;

a multi-scale adaptive filter coupled to the conjugate product processor for processing the complex interferogram to produce a filtered interferogram; and an information extraction processor coupled to the multi-scale adaptive filter that produces a predetermined data product.

2. The system of claim 1 wherein the multi-scale adaptive filter comprises:

a preprocessor for receiving complex images comprised of a phase-preserving soft-limiter normalized by average clutter magnitude;

a plurality of cascaded low pass filters coupled to the preprocessor that provide a plurality of outputs corresponding to partially filtered complex interferograms; and select/combine logic coupled to the plurality of cascaded low pass filters for combining the outputs of the plurality of cascaded low pass filters to produce an adaptively filtered interferogram.

3. The system of claim 1 wherein the predetermined data product comprises an elevation map.

4. The system of claim 1 wherein the predetermined data product comprises a velocity map.

5. The system of claim 1 wherein the multi-scale adaptive filter comprises:

a preprocessor for receiving complex images comprised of a phase-preserving soft-limiter normalized by average clutter magnitude;

a first plurality of identical cascaded stages that each comprise:

a low pass filter for receiving a partially-filtered complex interferogram from a previous pyramid level;

downsampling means coupled to the low pass filter for minimizing computation and storage requirements;

storage means coupled to the downsampling means for storing the partially-filtered complex interferogram for input to a next pyramid level;

select/combine logic coupled to the storage means for selecting the pyramid level at each pixel that produces the best filtered interferogram; and upsampling means coupled to the select/combine logic for allowing pixel-by-pixel comparison between two interferograms at adjacent pyramid levels;

a last cascaded stage that comprises:

a low pass filter;

downsampling means coupled to the low pass filter for minimizing computation and storage requirements;

storage means coupled to the downsampling means for storing for storing the partially-filtered complex interferogram for input to a next pyramid level; and upsampling means coupled to the storage means for allowing pixel-by-pixel comparison between two interferograms at adjacent pyramid levels; and select/combine logic coupled to the upsampling means of the second stage for combining the outputs of the plurality of cascaded low pass filters to produce a filtered interferogram.

* * * * *